United States Patent [19]

Wauhop, Jr.

[11] 4,099,337
[45] Jul. 11, 1978

[54] METHOD OF CURING CONCRETE ARTICLES BY WATER VAPORIZATION

[76] Inventor: Billy Joe Wauhop, Jr., 717 Forth St., Belvidere, N.J. 07823

[21] Appl. No.: 749,754

[22] Filed: Dec. 13, 1976

[51] Int. Cl.² ............................................. F26B 3/00
[52] U.S. Cl. .......................................... 34/26; 264/82
[58] Field of Search .................. 34/22, 26; 432/9, 23; 264/DIG. 43 A, DIG. 43 B, DIG. 43 C, 82

[56] References Cited

U.S. PATENT DOCUMENTS

| 343,281 | 6/1886 | Sharpe | 264/DIG. 43 |
|---|---|---|---|
| 773,709 | 11/1904 | Britain | 264/DIG. 43 |
| 1,514,936 | 11/1924 | Seifert | 264/82 |
| 1,853,419 | 4/1932 | Harris | 34/26 |
| 2,363,226 | 11/1944 | Brund | 264/82 |
| 3,327,032 | 6/1967 | Adams | 264/82 |
| 3,492,345 | 1/1970 | Simunic | 260/514 |

Primary Examiner—John J. Camby
Attorney, Agent, or Firm—Robert E. Burns; Emmanuel J. Lobato; Bruce L. Adams

[57] ABSTRACT

Concrete articles to be cured are charged into a kiln. A hot water bath is maintained on the kiln floor and the water is circulated through a heat exchanger and sprayed beneath the level of the concrete articles into the water bath to maintain the water bath at a temperature of 100°–200° F to thereby maintain the internal kiln atmosphere at a humidity greater than 90% and at a sufficiently high temperature to effect hydration and hardening of the cement and due to the closed nature of the kiln, the temperature therewithin can be maintained within 5° F from top to bottom. The sprayed hot water supplies the needed heat energy and the water vaporization within the kiln provides the degree of moisture needed to cure the concrete articles. As water rather than steam is used, less energy is needed to heat the water than required to generate steam so that the overall cost of curing the concrete articles is considerably reduced as compared to steam curing methods.

9 Claims, 2 Drawing Figures

METHOD OF CURING CONCRETE ARTICLES BY WATER VAPORIZATION

FIELD OF INVENTION

The present invention relates generally to the curing of concrete articles, and more particularly to a method of vapor curing concrete articles on a mass production basis without using steam.

BACKGROUND OF INVENTION

In the building and construction trade, considerable effort has been expended in improving and devising techniques for curing concrete articles such as blocks and similar structural units. As used in the art, the term "curing" as applied to concrete articles refers to the period between the molding operation and the time when the articles are strong enough to be used and during which hydration or hardening of the cement takes place through chemical reaction between the cement and water. Regardless of the curing technique employed, the curing parameters of time, temperature and moisture are the most important and must be suitably balanced so as to maintain the concrete in a moist condition until the cement has properly hydrated or hardened. Of course, these parameters depend to some extent upon the selection of the concrete aggregates, the amount of cement used and the desired resulting properties of the concrete articles as is well known to the skilled artisan.

The oldest curing technique is natural curing wherein the concrete articles are subjected to atmospheric conditions existing at the time the articles are made without special heating or wetting. The major drawbacks of natural curing are that the moisture needed for hydration of the cement is left to chance depending on weather conditions and that the curing process requires several weeks to 28 days. As a consequence and in view of the ever-increasing demand for concrete articles, natural curing has for the most part been replaced by more accelerated curing techniques.

One technique currently in use is low pressure steam curing. In this method and usually after the unavoidable time it takes to load the kiln, a sufficient quantity of steam is injected directly into the kiln to heat the internal kiln atmosphere to the desired temperature and at the same time maintain a high degree of saturation thereby providing the combination of heat and moisture which accelerates the hydration and hardening of the cement. Normally, saturated steam at atmospheric pressure is used to attain temperatures on the order of 140°–180° F or higher. In many instances, additional heat and moisture are added to the kiln atmosphere by burning a gas and recirculating the products of combustion, with or without the addition of moisture.

Low pressure steam curing is disadvantageous in that it is difficult to achieve a uniform kiln atmosphere at these relatively low steam pressures and therefore products of non-uniform quality are produced. One drawback is that during the time it takes to fully charge the kiln, i.e., on the order of 3 hours, the concrete articles first charged into the kiln will be cured at a different rate than the articles last charged in the kiln. Another drawback is that the total energy input in such a system is high due to the fact that considerable energy must be expended in generating steam and in supplying additional heat energy by burning fuel. Moreover, when burning fuel, the products of combustion, such as carbon dioxide, water vapor and nitrogen, all become part of the kiln atmosphere and depending upon the type fuel used and the composition of the concrete articles, the concentration of carbon dioxide may prove detrimental. For example, carbonation of the concrete caused by a chemical reaction of the carbon dioxide with the calcium hydroxide freed from the calcium silicates and aluminates in the cement during hydration often leads to formation of a skin of calcium carbonate on the wet surface of the concrete article. If carbonation occurs before the cement hydration compounds are formed and the cement gel is in an unstable condition, the results are detrimental and even though the strength of the cured article may be sufficiently high, the surface and corners thereof will be brittle and lead to excessive breakage in handling.

Another curing technique currently in use is high pressure steam curing using high temperature steam and such methods typically introduce steam into an autoclave type kiln at a temperature range of 350°–365° F and under saturated steam pressures of 120–150 psi. Under these conditions of temperature and pressure, the rate of chemical reaction of the cement is much accelerated as compared to that in the low pressure steam curing technique which typically operates in a temperature range of 140°–180° F. However, in high pressure steam curing, if the steam is allowed to enter the kiln before the concrete articles are allowed to attain their initial set, or if the pressure is brought up too fast, thermal shock may result. This in turn can cause crazing or cracking of the surface, distortion of shape, or formation of brittle articles. Another drawback of this method is the high energy input needed to generate high pressure steam and the relatively expensive cost of installing and operating such a system as compared to low pressure systems.

Another type steam curing technique involves circulating hot oil at a temperature of about 400° F through a network of piping and sprinkling cool water directly onto the heated piping. The water, upon contacting the oil-heated piping, is converted to low pressure steam. This low pressure steam system suffers the same disadvantages and drawbacks as discussed heretofore with respect to the other prior art steam curing systems.

SUMMARY OF INVENTION

It is therefore a primary object of the present invention to provide a method of curing concrete articles which overcomes or reduces the foregoing disadvantages and drawbacks of prior art curing methods.

It is another object of the invention to provide a method of curing concrete articles by spraying hot water into a water bath maintained on the kiln floor beneath the level of the articles and utilizing the vaporization of the sprayed hot water to obtain the heated and moist kiln atmosphere necessary for curing.

Another object of the invention is to provide a method of curing concrete articles within a closed kiln by circulating and spraying hot water therewithin to obtain a highly uniform internal kiln atmosphere which varies throughout by no more than 5° F and which has a humidity greater than 90%.

A still further object of the invention is to provide a method of curing concrete articles at a lower curing temperature, on the order of 120° F, as compared to either low pressure steam systems where the curing temperature is on the order of 140°–180° F or high pressure steam systems where the curing temperature is on the order of 350°–365° F thereby reducing considerably the energy cost needed to effect curing.

A still further object of the present invention is to provide a method of curing concrete articles in a closed kiln by spraying hot water beneath the level of the articles into a water bath on the kiln floor and circulating the water through a heat exchanger to raise the water temperature to a degree sufficient to supply the needed heat energy for curing so that the water bath functions as a heat reservoir conserving heat energy within the closed kiln.

Yet another object of the invention is to provide a method of curing concrete articles and which does not subject the concrete articles to saturated steam which is disadvantageous in that it releases and subjects the concrete articles to thermal shock principally caused by the immediate absorption of the heat of vaporization of steam.

The above and other objects are achieved according to the method of the invention by charging concrete articles to be cured into a closed kiln in which a hot water bath is maintained on the kiln floor. The water is circulated through a heat exchanger and sprayed beneath the level of the concrete articles into the water bath to maintain the water bath at a temperature of 100°–200° F to thereby maintain the internal kiln atmosphere at a humidity greater than 90% and at a sufficiently high temperature to effect hydration and hardening of the cement and due to the closed nature of the kiln, the temperature therewithin can be maintained within 5° F from top to bottom. The sprayed hot water supplies the needed heat energy and the water vaporization within the kiln provides the degree of moisture needed to cure the concrete articles. As water rather than steam is used, less energy is needed to heat the water than required to generate steam so that the overall cost of curing the concrete articles is considerably reduced as compared to prior art steam curing methods.

Having in mind the above and other objects, features and advantages of the invention that will be evident from an understanding of this disclosure, the present invention comprises a method of curing concrete articles as illustrated in the presently preferred embodiment of the invention which is hereinafter set forth in sufficient detail to enable those persons skilled in the art to clearly understand the function, operation and advantages of it when read in conjunction with the accompanying drawings.

DETAILED DESCRIPTION OF PREFERRED EMBODIMENT

The drawings show an exemplary type kiln apparatus for carrying out the method of the invention and for sake of clarity, the kiln has been shown primarily in outline form with only those portions shown which are needed for a clear understanding of the invention. It is understood that the invention may be carried out using a standard kiln of the closed type. For example, the kiln could have front and rear door assemblies each comprised of a plurality of individually operable doors so as to enable loading and unloading of individual pallets of concrete articles while otherwise maintaining the kiln in a closed condition, or the kiln could have front and rear air-curtain doors which would maintain the needed closed kiln atmosphere. As shown, the kiln 10 comprises one bay housing three rows of racks and for purposes of describing the invention and not by way of limitation, the invention will be described with reference to curing concrete blocks.

Figure 1:
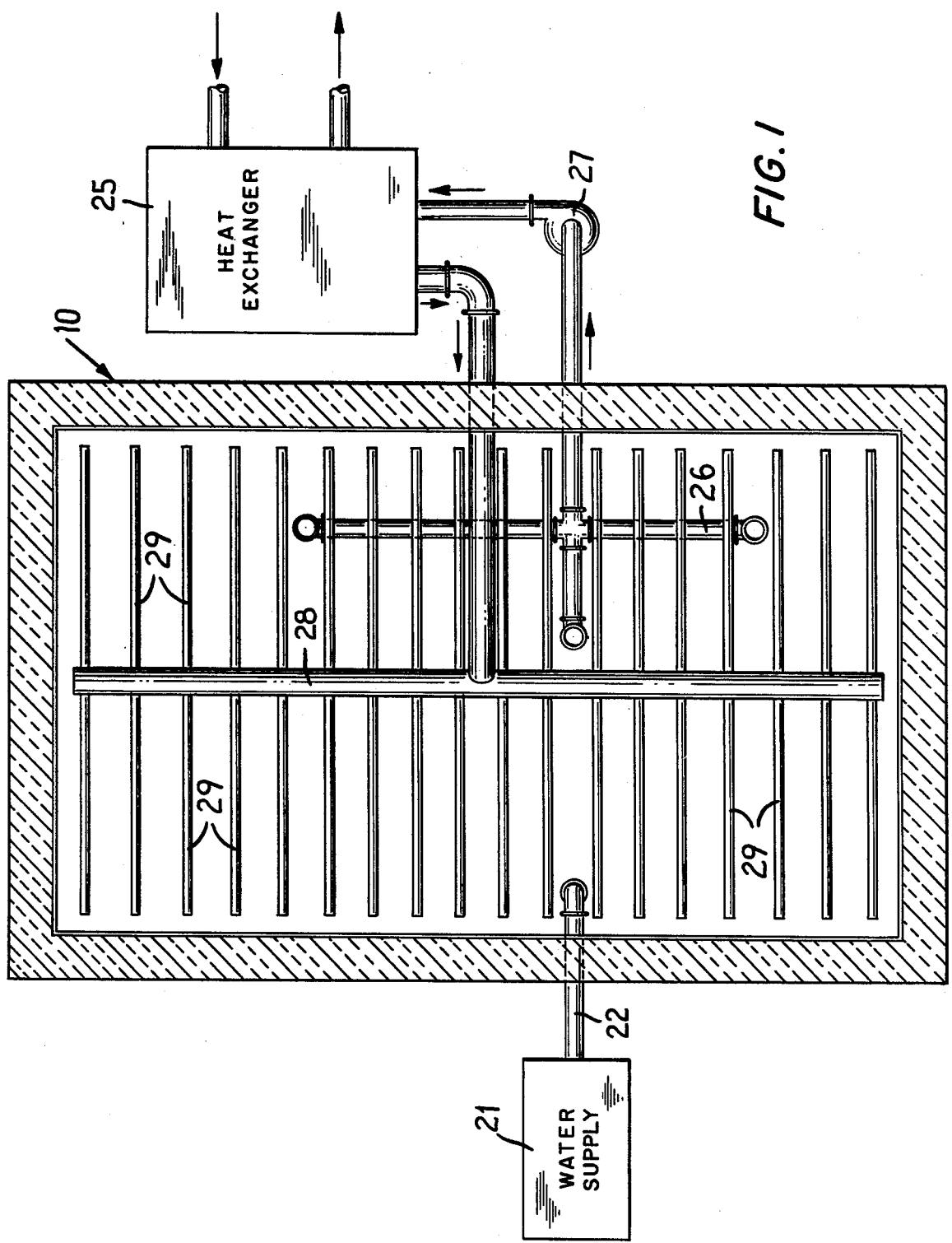
FIG. 1 is a schematic sectional view, as viewed along the line 1—1 of FIG. 2, of a closed type kiln and associated equipment which can be used to carry out the method of the invention.
Figure 2:
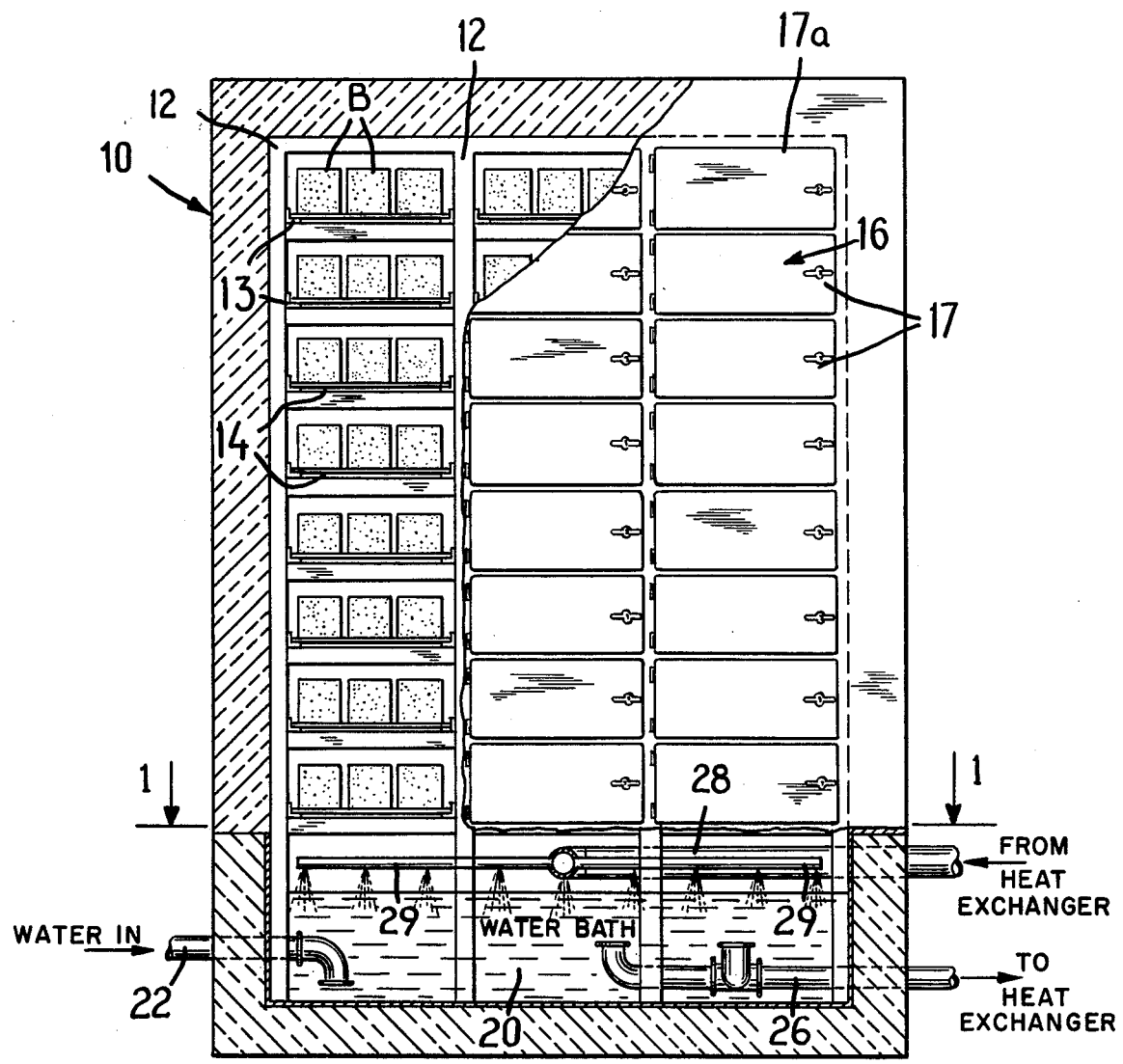
FIG. 2 is a schematic front elevational view, partly in section, of the kiln and equipment shown in FIG. 1.

As seen in FIG. 2, the kiln 10 contains four support members 12 standing upright on the floor of the kiln and having affixed thereto longitudinally extending tracks 13 for slidably receiving pallets 14 containing thereon the concrete blocks B to be cured. For simplicity of construction, the two middle support members 12 have the tracks 13 affixed on opposite sides thereof in a manner well known in the art. At the front and rear of the kiln 10 are disposed door assemblies and only a part of the front door assembly 16 is visible in FIG. 2. Both door assembles are constructed in a similar fashion and comprise a plurality of individually operable doors 17 each of which controls access to one set of tracks 13 so that, for example, when the front door 17a and corresponding rear door are opened, a pallet containing blocks to be cured may be charged into the kiln through the open front door while a pallet containing cured blocks is pushed out the open rear door and throughout this loading-unloading step, the other doors remain closed thereby minimizing escape of the internal kiln atmosphere to the exterior of the kiln. In this manner, there is minimal disruption of the kiln atmosphere during charging and discharging of the concrete blocks as is known in the art with this type kiln.

In accordance with the invention, a water bath 20 is formed at the base portion of the kiln beneath the level of the lowermost rows of blocks. The water bath is formed by adding water to the base portion of the kiln from a water supply 21 through an inlet pipe 22. The water bath 20 is heated and maintained in a heated state by circulating the water through a heat exchanger 25. In order to effect water circulation, suction or exhaust piping 26 is connected to the inlet side of a pump 27 whose outlet side is connected to the heat exchanger 25. The water pumped through the heat exchanger 25 is heated therein by the absorption of heat energy from the heat exchange medium and the heated water exits from the heat exchanger and flows through a distribution network comprised of a header pipe 28 running lengthwise of the kiln and which distributes the heated water to a series of branch pipes 29. The branch pipes extend transversely with respect to the header pipe 28 and are provided on their undersurface with a set of axially spaced apart nozzle openings for spraying the water downwardly into the water bath 20.

The method of the invention will now be described with reference to the foregoing apparatus. During initial start-up, water is supplied to the base portion of the kiln from the water supply 21 to form the water bath 20 which may, for example, have a depth of approximately 10 inches. The water is then circulated through the heat exchanger 25 to heat the water, for example, to a temperature of from 100°–200° F and the water thus heated is distributed through the header pipe 28 to the branch pipes 29 from which it is sprayed into the water bath. The circulation is continued until the water bath stabilizes at the desired temperature. During this time the kiln doors are closed and sealed so that the internal kiln atmosphere likewise increases in temperature and moisture. If desired, the blocks can be charged into the kiln during this initial start-up period.

Concrete blocks B which are formed by a block machine (not shown) on pallets are then charged into the kiln for curing in a manner well known in the art. When leaving the block machine, the concrete blocks typically are at a temperature of 40°–70° F and are charged into the kiln at this temperature. The hot water bath 20 is maintained at the desired temperature by circulating the water through the heat exchanger 25 so as to maintain the internal kiln atmosphere at the desired curing temperature, for example between 150°–160° F. For this purpose, temperature and moisture sensors (not shown) of known construction are placed within the kiln and connected to suitable circuitry for controlling the operation of the heat exchanger 25 and the pump 27 so as to maintain the desired internal kiln atmosphere for curing the particular type concrete blocks. In practice, the blocks remain in the kiln for 6 to 24 hours depending upon the composition of the concrete block and the storage capacity of the plant.

In operation, the first pallet of blocks charged into the kiln will be cured sooner than the blocks charged thereafter and at the time these cured blocks are ready for removal from the kiln, they will be situated adjacent the rear door assembly. In order to remove the cured blocks, the corresponding front and rear doors are opened and a fresh pallet containing blocks to be cured is loaded in the kiln along the tracks 13 and during loading of this pallet, all the pallets in that row are pushed rearwardly thereby discharging the pallet of cured blocks from the open rear door. The corresponding front and rear doors are then closed and this sequence is repeated as often as needed to charge fresh blocks into the kiln and at the same time, discharge the cured blocks.

In accordance with the invention and due to the fact that the kiln is of the closed type, the heated water bath 20 functions as a heat reservoir and supplies the needed heat energy through vaporization and diffusion of the water vapor throughout the kiln to effectively maintain the kiln atmosphere at the desired temperature. In view of the fact that water has about four times the heat capacity of air, the effectiveness of the hot water bath 20 in maintaining and stabilizing the internal kiln temperature can be readily appreciated. An important aspect of the invention resides in the uniform spraying of the heated water into the water bath beneath the level of the blocks and the accompanying intermixing of air and water which occurs in this region. By spraying the water, the exposed surface area thereof greatly increases with respect to the surrounding air thereby promoting the vaporization of the water and assisting in diffusing the water vapor throughout the kiln. The spraying thus considerably increases the convective heat transfer coefficient of the system so that a uniform curing atmosphere is maintained within the kiln.

In accordance with another aspect of the invention, the input energy needed to create the curing atmosphere within the kiln is considerably less than that required in prior art systems using steam. According to the invention, it is only necessary to supply heat energy to the water to raise it in temperature below its boiling point to between 100°–200° F and not to convert the water to steam. In contrast, in the prior art systems using steam, it is necessary to impart considerably more energy in order to convert the water to steam and in this case, approximately 940 B.T.U. must be added to each pound of water to convert it to steam and this energy conversion is not needed in the inventive method since water and not steam is used to create and sustain the internal kiln atmosphere.

Moreover, by carrying out the method of the invention, the desired moisture content of the kiln atmosphere is easily maintained and, for example, in actual practice the relative humidity of the kiln atmosphere can be maintained above 90%. Due to the closed nature of the kiln and the effectiveness of the heated water bath, the curing temperature can be maintained within 5° F from top to bottom so that the invention enables a simple yet inexpensive control of the moisture and temperature parameters needed to achieve rapid and uniform curing. Also, by virtue of the closed nature of the kiln and the manner in which the blocks are charged and discharged, only minimal heat energy loss occurs so that the inventive method is much more efficient than the prior art steam curing techniques which have comparatively high heat energy losses due to the practice of exhausting the kiln atmosphere during the exhausting phase and during the charging-discharging of the blocks.

While the invention has been disclosed with reference to one preferred embodiment, it is understood that many modifications thereof and changes thereto will become apparent to those ordinarily skilled in the art and the present invention is intended to cover all such obvious modifications and changes which fall within the spirit and scope of the invention as defined in the appended claims.

What I claim is:

1. A method of curing concrete articles in a kiln, comprising the steps of: forming a water bath at the base of the kiln beneath the lowermost level of the concrete articles to be cured; heating and maintaining the water bath at a sufficient temperature, below its boiling point, and spraying the heated water into the water bath at a level beneath the lowermost level of the concrete articles so as to promote and effect vaporization of the water to obtain throughout the kiln a substantially uniform curing atmosphere having sufficient heat and moisture to hydrate and harden the cement to thereby cure the concrete articles; and replenishing the water, as needed, to maintain the water bath throughout the curing.

2. A method according to claim 1; wherein said heating and maintaining step comprises circulating the water through a heat exchanger to effect heating of the water to said sufficient temperature and then spraying the heated water into the water bath at a level beneath the lowermost level of the concrete articles.

3. A method according to claim 1, wherein said heating and maintaining step comprises heating and maintaining the water bath at a temperature of from 100°–200° F.

4. A method according to claim 3; wherein said substantially uniform curing atmosphere is obtained without adding any additional heat or moisture thereto other than that supplied by heating and maintaining said water bath.

5. A method according to claim 1; wherein said substantially uniform curing atmosphere is obtained without adding any additional heat or moisture thereto other than that supplied by heating and maintaining said water bath.

6. A method of curing concrete articles in a kiln, comprising the steps of: forming a water bath at the base of the kiln beneath and directly exposed to the lowermost level of the concrete articles to be cured; heating and maintaining the water bath at a desired temperature and mixing the heated water with the kiln atmosphere in the region below the level of the lowermost concrete articles to promote and effect vaporization of the water and transfer of heat to the kiln atmosphere thereby obtaining throughout the kiln a substantially uniform curing atmosphere having sufficient heat and moisture to hydrate and harden the cement to thereby cure the concrete articles; and replenishing the water, as needed, to maintain the water bath throughout the curing.

7. A method according to claim 6; wherein said heating and maintaining step comprises circulating the water through a heat exchanger to effect heating of the water to said desired temperature.

8. A method according to claim 6; wherein said heating and maintaining step comprises heating and maintaining the water bath at a temperature of from 100°–200° F.

9. A method according to claim 6; wherein said mixing step comprises spraying the heated water into the water bath at a level beneath the lowermost level of the concrete articles.

* * * * *